Figure 1:
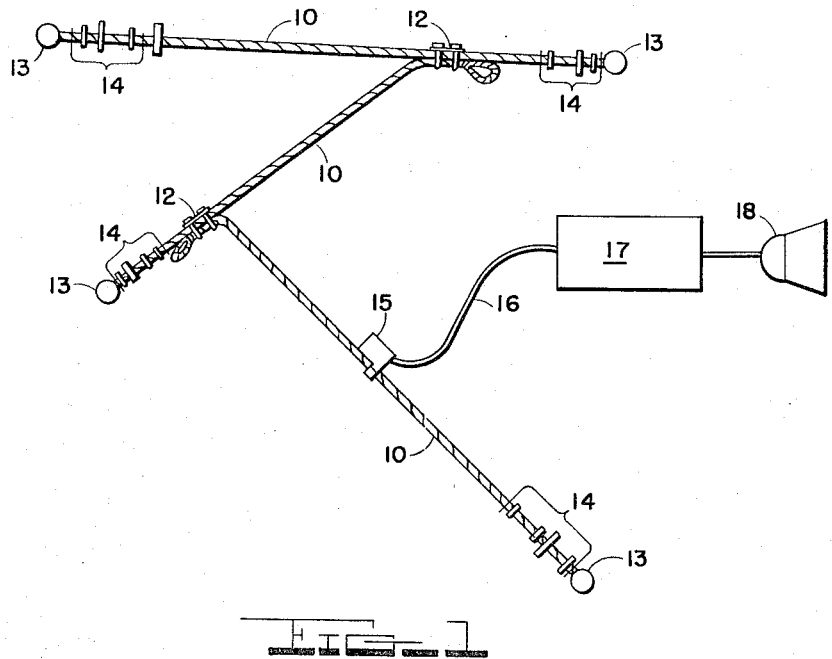

INVENTORS.
HORACE M. TRENT
THOMAS F. JONES JR

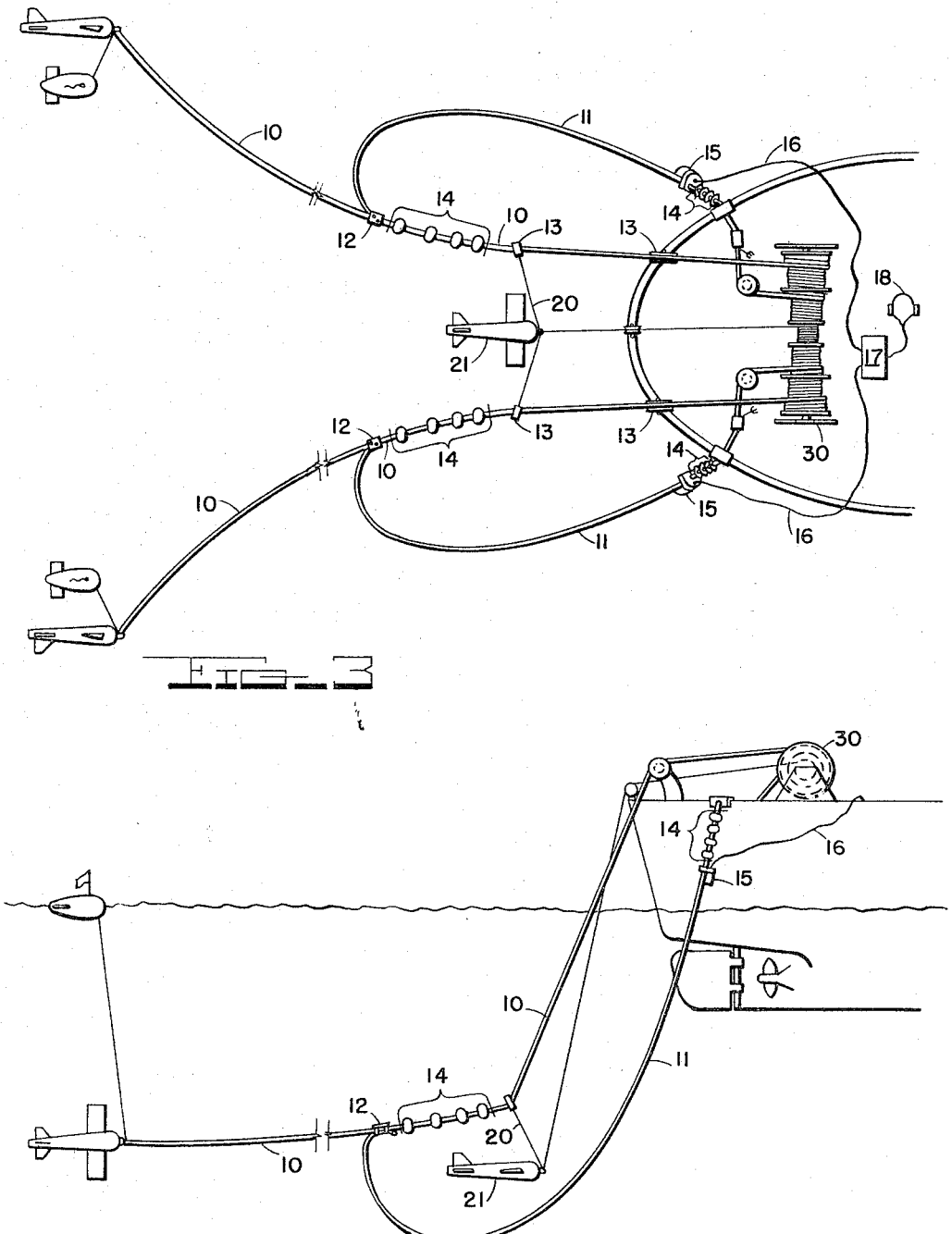

March 14, 1967  H. M. TRENT ETAL  3,309,652
UNDERWATER VIBRATION DETECTOR
Filed March 12, 1946  4 Sheets-Sheet 3

Inventors
HORACE M. TRENT
THOMAS F. JONES JR.

By M. A. Hayes

Attorney

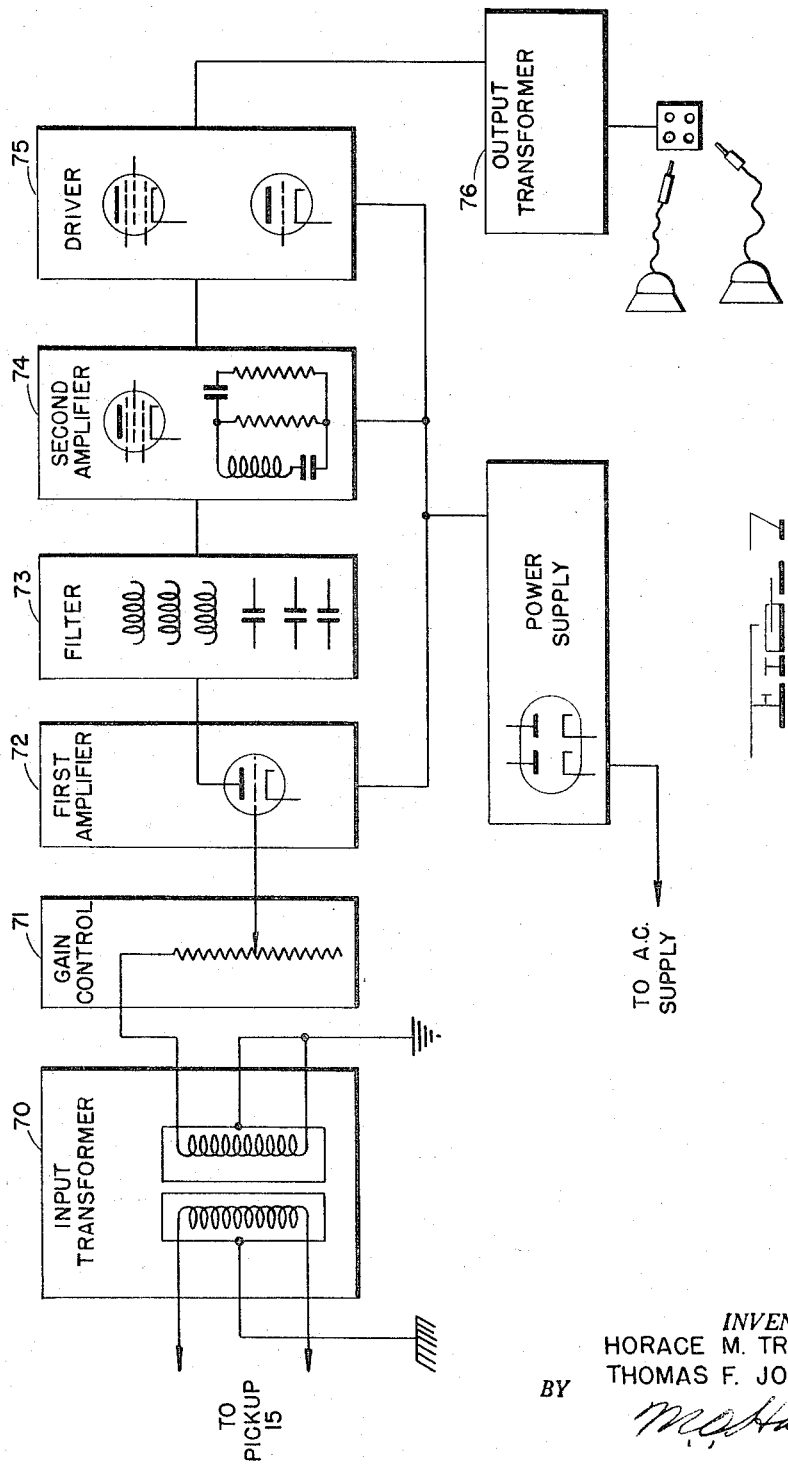

United States Patent Office

3,309,652
Patented Mar. 14, 1967

3,309,652
UNDERWATER VIBRATION DETECTOR
Horace M. Trent and Thomas F. Jones, Jr., Alexandria, Va. (both of Naval Research Laboratory, Anacostia Station, Washington, D.C. 20020)
Filed Mar. 12, 1946, Ser. No. 653,928
3 Claims. (Cl. 340—6)

The invention described herein may be manufactured and used by or for the Government of the United States of America for governmental purposes without the payment of any royalties thereon or therefore.

This invention relates to systems for monitoring acoustic vibrations in metal cables. It has particular application to systems for monitoring metal cables to detect contact with submerged objects, in minesweeping and similar operations.

Objects of the present invention are to provide a system for monitoring acoustic vibrations in metal cables which will reject undesired vibrations, give continuous indication of the acoustic vibrations of interest, and will be selectively sensitive to the predominant frequencies of the vibrations of interest.

Features of the invention are the correlation of the peculiar properties of simple mechanical vibration filters to the requirements of the service for which these are intended, the effective separation of metal cables thereby into parts active and inactive as carriers of acoustic vibrations, the use of other cables likewise separated having their active parts in contact transmissive of acoustic vibrations, and the use of an electromechanical pickup and an amplifier selective to the predominant acoustic frequencies of interest.

It has been found generally in monitoring cables for acoustic vibrations that certain characteristic difficulties arise from the associated rigging of the cables. The ordinary fastenings and pulleys employed in rigging the cables are effective attenuators of the vibrations. In addition, the rigging often serves as a means for introducing undesirable acoustic vibrations into the cables.

A situation of this sort arises in minesweeping. A metal cable, called a sweep cable, is towed by a vessel, and it is desired to detect contact of the sweep cable with a submerged object such as the mooring line of a mine. Ordinarily, detection of contact is difficult. The contact is known to produce acoustic vibrations in the sweep cable. These vibrations are both longitudinal and transverse. Owing to the damping action of the water, the transverse vibrations of the cable are damped in a very short distance away from the point of contact. The longitudinal vibrations, however, are transmitted for a considerable distance along the cable.

A possibility exists, therefore, of monitoring the vibrations by attaching a suitable pickup device to the cable at some convenient point aboard. This turns out to be impractical because of the attenuation of the pulleys over which the cable is paid out, and even more because of the introduction of vibrations of large amplitude into the cable from the vessel itself. These vibrations are generally of such intensity as to mask the vibrations produced by the contact, and in any case make detection of contact very difficult. Changing the point of attachment of the pickup device to a point outboard of the pulleys furnishes at best a partial solution to these difficulties, as well as bringing up peculiar difficulties of its own.

To meet the problem of the undesired vibrations introduced by the vessel, methods of acoustically insulating the cable fastenings and points of contact transmissive of acoustic vibrations from the vessel to the cable may be undertaken. It has been found that this is usually impractical in itself. Accordingly, a somewhat different approach to the problem, involving the use of effective acoustic barriers to the undesired vibrations, has been sought. These barriers may be put between the vessel or any other source of undesired vibrations and the part of the sweep cable that is active as a carrier of the desired vibrations. Other metal cables may be used as carriers of the acoustic energy from a point outboard of this barrier, on the active part of the sweep cable, to a point accessible to a suitable pickup device. Since these cables in turn may have to be attached to the ship or other source of undesired vibrations, corresponding barriers to these vibrations must be provided. It has been found entirely practicable in this invention to follow this procedure.

The barriers provided in the invention consist of a mechanical filter which can be constructed with great facility. A number of heavy weights are clamped on the sweep cable, and their spacing is made unequal. The actual values of weights and spacing are not at all critical. In a number of cases, a wide variety of weights have successfully combined with a wide range of spacings. An approximately satisfactory calculation of the weights and spacings can be made on the basis of well known physical principles. Optimum values may be determined by experiment for any particular situation.

This principle of the invention lends itself readily to a larger field of utility. In any system for monitoring acoustic vibrations in metal cables, undesirable vibrations may be introduced into the cables, and there may be fastenings or pulleys or like devices which attenuate the vibrations of interest and serve as points of introduction of undesired vibrations. The invention overcomes the difficulties in the following general way: the active parts of the cables are separated from parts in which undesirable vibrations exist by means of mechanical filters as described; a network of cables which may be likewise separated are employed as carriers of acoustic vibrations to a point accessible to a pickup device; an amplifier system which is selective to the predominant acoustic frequencies produced in the particular application is provided.

Figure 2:
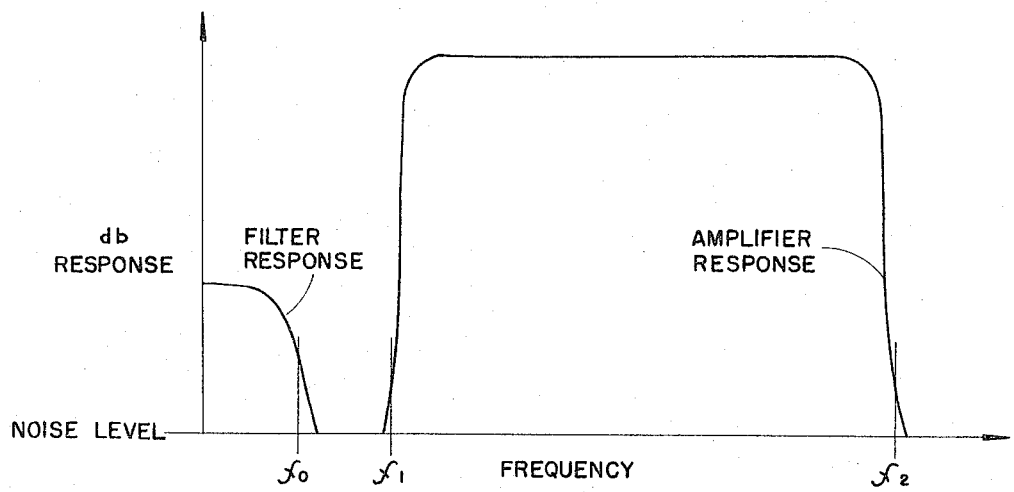

The principles of the invention will be further understood from the following specification and drawings, of which, FIG. 1 illustrates the elements of an embodiment of the invention, FIG. 2 is a graph of the frequency response of the mechanical filter and the selective amplifier, FIG. 3 shows a top view of another embodiment of the invention which may be used in minesweeping.

Figure 5:
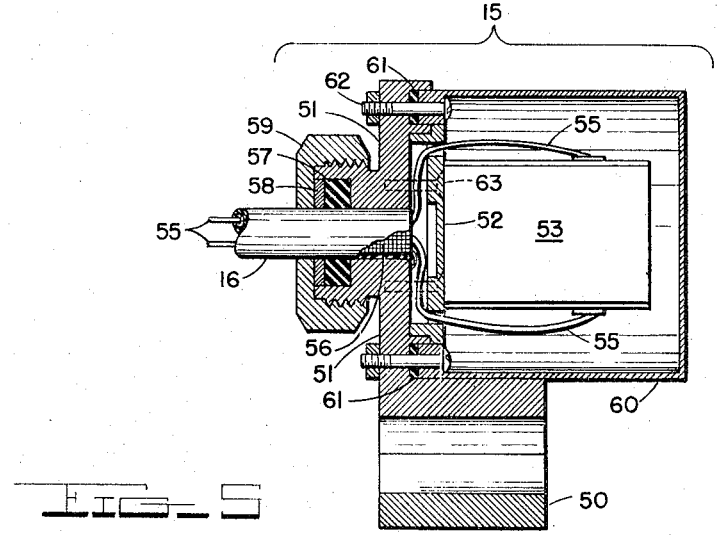
Figure 6:
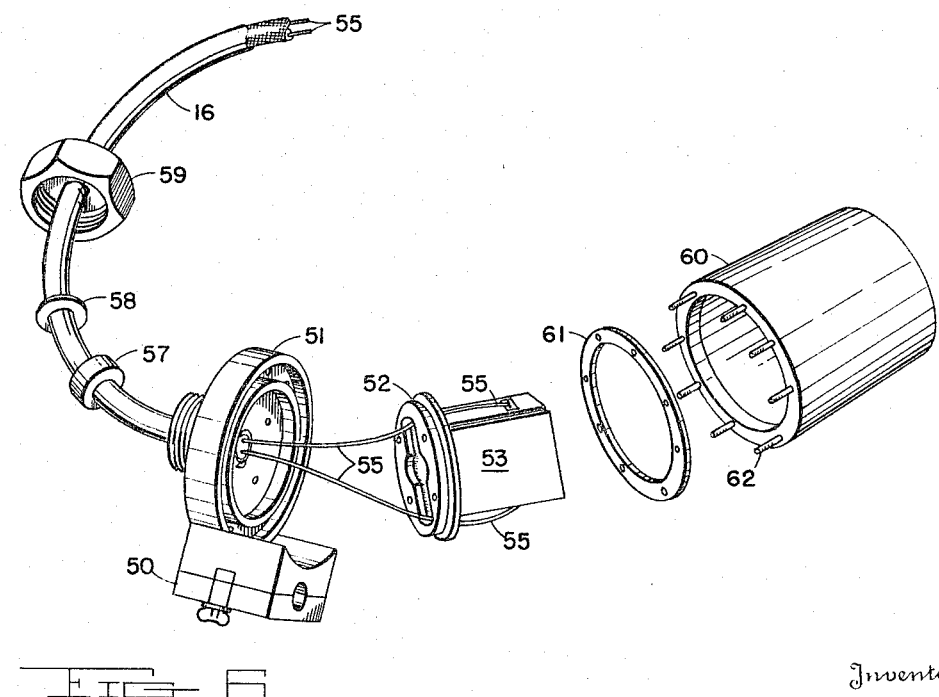

FIG. 4 shows a view from a semi-submerged vantage point of the embodiment of FIG. 3, FIG. 5 is a section of a pickup device which may be used in the embodiment of FIGS. 3 and 4, FIG. 6 shows an exploded assembly of the same pickup device, and FIG. 7 is a block diagram in schematic of an embodiment of selective amplifier which may be used in the embodiment of FIGS. 3 and 4.

Referring to FIG. 1, there is shown a set of metal cables 10, joined at points 12 of vibrational transmissive contact to other cables 10. These points of contact 12 may be simple clamps which fasten one end of an active part of one cable 10 to an active part of another cable 10. In the figure, the cable ends are shown to be formed into an eye which is wound with manila rope, to prevent the generation of rubbing noises. Similar precautions can be taken in any case when necessary. The cables are shown taut in FIG. 1, although the transmission of the acoustic vibrations takes place entirely satisfactorily when these are slack. The small circles 13 are fastenings, or pulleys, or rigging attachments. Between such points 13 and the active parts of cables 10 are filters comprised of weights 14 clamped to the cables and unequally spaced. A pickup device 15, which may involve piezoelectric elements, is shown attached to an active part of a cable 10. Vibrations arising in the active part of that cable 10 to which the pickup device 15 is attached, and vibrations in any active part of other cables joined to each other and to that cable 10 at contact points 12 will excite the pickup device to produce electrical vibrations. Ship-generated and other undesired vibrations that would come into cables 10 through the fastenings or pulleys 13 are substantially rejected by the filters. It will be convenient to refer to the filter 14, it being understood the filter is constructed of the weights 14 clamped to the cable as has been shown. The electrical output of pickup 15 is fed through conductors 16 to the band-pass amplifier 17. The amplifier 17 is designed to have maximum gain at the predominant acoustic frequencies arising in the type of vibrations to be monitored. It may include an equalizer in order that the system may have a desired overall characteristic over the range of these predominant frequencies. A speaker 18, headphones, or other audible indicator of the contact is excited by the output of the amplifier. There may also be provision for visual indication of the contact.

Any longitudinal vibrations transmitted by the cables 10 have characteristic frequency spectra. Usually these spectra cover a very wide band, including audible and superaudible frequencies. The amplifier 17 is designed to amplify only those frequencies between the limits $f_1$ and $f_2$, as shown in FIG. 2, which include the predominant frequencies of the particular vibrations. The most troublesome of the vibrations that might come through the fastenings, rigging, or pulleys 13 would be those including frequencies between $f_1$ and $f_2$. Filters 14 are low-pass filters, however, with an upper cutoff frequency $f_0$ well below $f_1$, as shown in FIG. 2. This filter characteristic refers to longitudinal vibrations.

Referring to the embodiment of the invention shown in FIGS. 3 and 4, acoustic vibrations may be generated in contact and subsequent sliding of a submerged object such as a mine mooring line across the sweep cable 10. Satisfactory transmission of the longitudinal vibrations produced in such contact takes place for a considerable distance in the sweep cable 10. Filter 14 on cable 10 is a low-pass filter with a characteristic as shown in FIG. 2. The filter consists of weights 14 spaced at unequal intervals and clamped to the sweep cable 10. The weights 14 may be of such shape that they can be reeled in and out on the winch drum 30 with the sweep cable. The filter is located just aft of the junction 13 of the sweep cable 10 with the cable 20 from the depressor 21. Accordingly any ship-generated vibration of frequency greater than $f_0$, the upper cutoff frequency of the filter 14, is confined to the part of the sweep cable forward of the junction 13. Ship-generated vibrations of frequency less than $f_0$ are passed by filter 14, but are rejected subsequently in the electronic part of the system.

Since the vibrations arising from the contact are confined to that part of the sweep cable aft of the filter 14, corresponding to the active part of the cables of FIG. 1, some methods must be provided for transmitting these vibrations to a position accessible to the pickup and amplifier. It may be satisfactory to have a pickup device attached to sweep cable 10 just aft of filter 14. However, doing this brings in difficulties peculiar to submerged electrical and acoustical apparatus as well as problems arising from the transverse vibrations imparted the cable by the ship. These transverse vibrations are found to be of low frequency, and are highly damped by the water. In parts of the cable which are submerged, the effect of these vibrations is not so serious. The filter 14 serves also to attenuate the transverse vibrations. Nevertheless, at points of the taut sweep cable which lie between the filter 14 and the water level, these transverse vibrations may seriously reduce the lifetime of any practical pickup device. To avoid these difficulties, another cable 11, called a single cable, is provided as a carrier of the acoustic vibrations of interest. One end of this cable is clamped or otherwise suitable secured in acoustically transmissive contact at a point 12 aft of filter 14, on the active part of the sweep cable 10, and then brought round in a bight through a chock in the side of the ship, to which it is suitably secured. A second filter 14, entirely similar to the first employed with the sweep cable, is provided on cable 11 just outboard of the chock, and keeps ship-generated vibrations from entering this cable. A vibration pickup 15 is attached to signal cable 11 at a point on its active part, aft of its filter 14. Because of the slackness of this signal cable 11, transverse vibrations from the ship are present to a small degree. Longitudinal vibrations, however, are satisfactorily transmitted from the sweep cable 10. This pickup converts the acoustic vibrations in the cable 11 into electrical vibrations, which are then carried in conductor 16 to electronic amplifier 17, and then to earphones or other indicative apparatus 18.

From the foregoing it will be clear that the portion of cable 11 inboard of the pickup 15 and adjacent filter 14 is only for support of the sound transmitting portion and not for sound transmission to or from the ship. Likewise any portions of the cables 10 inboard of the filters are solely for mechanical support and not for sound conduction. Those portions of the cables outboard of the filter elements 14 are free of filters.

Provision may be made to monitor two or more sweep cables simultaneously and a selector switch provided to select any one of the cables desired for exclusive monitoring.

FIGS. 5 and 6 show detail of a vibration pickup which may be used to convert longitudinal vibrations in the signal cable 11 into electrical vibrations. With reference to FIG. 5, longitudinal vibrations present in the cable 11 are transmitted through the cable clamp 50 to the frame 51 and then to the crystal backing plate 52. One end of the crystal assembly 53 follows the vibration of the plate 52 to which it is cemented while the other end has vibrations of lesser amplitude. Stresses are thus generated in the crystals, and the result piezoelectric vibrations are fed through a shielded pair of leads 55 to the electronic amplifier. The conductors are protected from stray electric fields with a shielding 56 connected at the pickup end to the frame 51. To protect the crystals from the effects of spray, etc., the entire assembly is sealed to be water-tight. With reference to FIG. 6, this is accomplished on the one side of the frame 51 by means of a gasket 57, washer 58, and hollow nut 59. On the other side, housing 60 and gasket 61 are fitted over the crystal unit 53 and secured to the frame 51 with screws 62. The crystal unit 53 itself is secured to the frame 51 by means of four screws 63, as seen in FIG. 5.

In FIG. 7 is shown a block diagram of the electronic part of the system. The vibration pickup 15 feeds ship vibrations of frequency below $f_0$, and noises of all frequencies, from the sweep cable 10 to input transformer 70. This transformer is electrostatically shielded to shut out possible noise voltages that may arise between the power line and the water ground. The vibrations go through the potentiometer gain control 71 to the first amplifier 72, and then to band-pass filter 73 which has a characteristic of the type shown in FIG. 2. The filter passes the acoustic vibration frequencies which are predominant in the cables as a result of the contact. Second amplifier 74 has an equalizer circuit to give an overall flat output characteristic which is desirable in order to more readily recognize contact noises, and to be able to recognize one type of contact noise from another. The second amplifier output goes to driver stage 75, and its output in turn is fed to output transformer 76 which has provision for multiple outputs on its secondary, so that a number of audible indicators 18 may be used in different parts of the ship.

In an embodiment reduced to practice in minesweeping operations, the following figures were noted:

| | Cycles per second |
|---|---|
| $f_0$ | 700 |
| $f_1$ | 900 |
| $f_2$ | 3000 |

It has been found that supersonic vibrations are dissipated into the water, and that the predominant vibrations transmitted in the cables lie in the acoustic range. Thus nothing but noise is gained in monitoring above 3000 cycles per second.

No attempt has been made to exhaustively cover or point out all applications of the present invention. Numerous applications and features of the invention will be apparent to those skilled in the art.

What is claimed is:

1. A system for giving audible indication of contact of a sweep cable with a submerged object in minesweeping operations, comprising a metal sweep cable towed by a ship and partially submerged by a depressor, a first mechanical filter constructed of unequally spaced weights clamped on said sweep cable aft of the junction of said sweep cable with a line from said depressor, a second metal cable leading from the ship to a point of acoustically transmissive contact with said sweep cable, an electroacoustic pickup device attached to said second metal cable, a second mechanical filter constructed of unequally spaced weights clamped on said second metal cable between said pickup device and the ship, a band-pass amplifier selectively responsive to the predominant frequency components of the electroacoustic pickup output, and audible indicating devices driven by said amplifier output.

2. A system for giving audible indication of contact of a sweep cable with a submerged object in minesweeping operations, comprising a metal sweep cable towed by a ship and partially submerged by a depressor, a first mechanical vibration filter clamped on said sweep cable aft of the junction of said sweep cable with a line from said depressor, a second cable secured at one end to the ship through a second vibration filter and at the other end to a point on the sweep cable in acoustical contact with the latter aft of said first mechanical vibration filter, an electroacoustic pickup device attached to said second metal cable, an amplifier operatively connected to the pickup device, and an indicating means operatively connected with said amplifier.

3. A system for indicating contact of a sweep cable with a submerged object in mine sweeping operations comprising a solid metal sweep cable towed by a ship and submerged by a depressor, a pickup device mechanically connected to the cable at a given point intermediate the ship and the free end of the cable and adapted to be excited substantially solely by mechanical vibrations in the cable to produce electrical vibrations, a band-pass amplifier having maximum gain for a given band of frequencies, means feeding the electrical output of said pickup device to the amplifier, a low-pass mechanical vibration filter connected between the ship and said given point on the cable, said low-pass filter having an upper cutoff frequency well below said given frequency, and indicating means operatively connected with said amplifier.

References Cited by the Examiner

UNITED STATES PATENTS

| 720,015 | 2/1903 | Forster | 177—311 |
| 793,896 | 7/1905 | Mundy | 177—386.1 X |
| 1,470,733 | 10/1923 | Hayes. | |
| 1,977,198 | 10/1934 | Nicolson | 177—352 |
| 1,992,538 | 2/1935 | Monroe et al. | 174—42 |
| 2,342,869 | 2/1944 | Kinsley | 178—44 |
| 2,396,847 | 3/1946 | Hathaway | 179—107 |

CHESTER L. JUSTUS, *Primary Examiner.*

H. MARANS, NORMAN H. EVANS, *Examiners.*

L. C. LITTLE, J. H. SPALLA, R. A. FARLEY,
*Assistant Examiners.*